2,937,676
ROTATABLY SUPPORTED RADIALLY EXPANSIBLE TIRE MOUNT

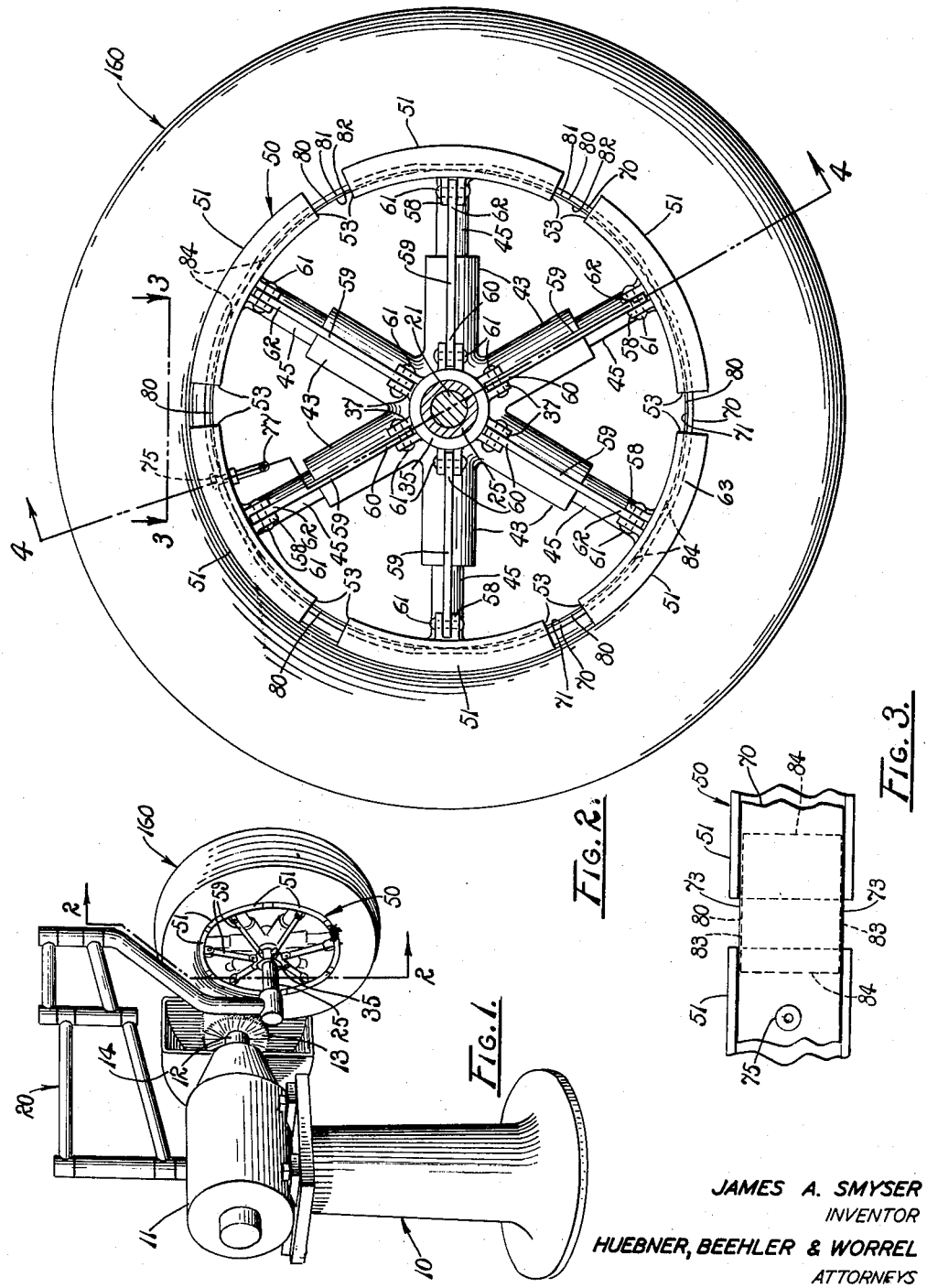

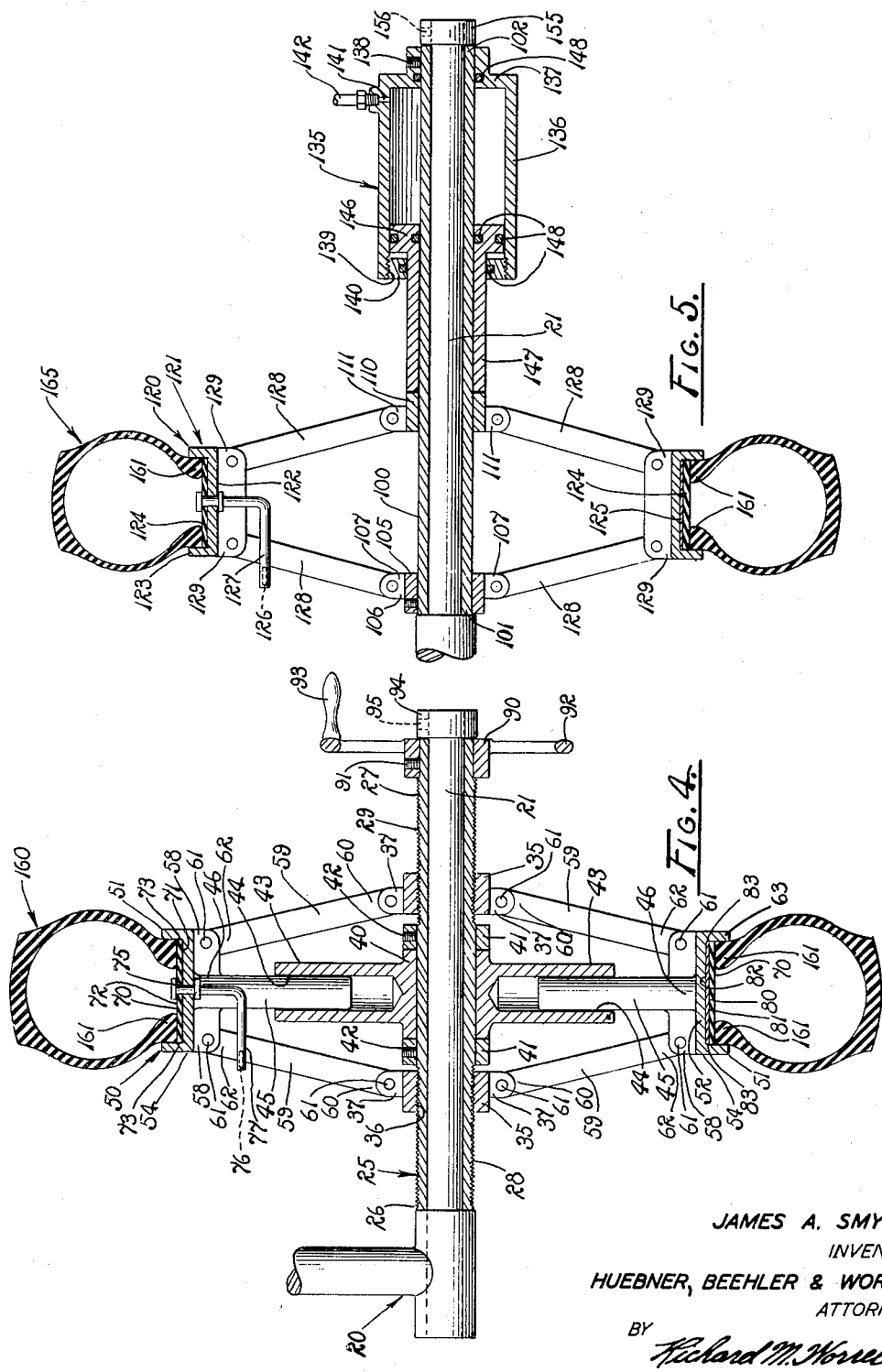

James A. Smyser, 207 Harrison St., Taft, Calif.

Filed May 21, 1957, Ser. No. 660,572

8 Claims. (Cl. 144—288)

The present invention relates to an apparatus for mounting a tire to be worked upon and more particularly to such an apparatus for mounting a tire separate from its normal rim or wheel in work position and for enabling inflation and rotation of the tire while in said position. The invention has particular application to tubeless tires, as will subsequently become apparent, but is not limited to such specialized use.

Prior to recapping a tire, it is generally necessary to buff and to dress the worn treads to provide an externally smooth, symmetrical and clean surface. For this purpose the tire is usally mounted in a substantially vertical plane for rotation about a horizontal axis. It is desirable at the same time to be able to inflate the tire so that external pressure can be applied against the tire without collapsing it.

Devices have been known for mounting a tire for this purpose but for various reasons, they have not accomplished the purposes of the present invention. It has been known to mount a tire equipped with an inner tube on a conventional rim much the same as on a vehicle except that the rim is supported on a shaft adjacent to the buffing or dressing wheel. It has also been known to provide diametrically split or otherwise divided rims for the purpose. Such devices have been of use but have been subject to certain difficulties. With the advent of tubeless tires, they have become highly impractical. If a conventional rim for a tubeless tire is used, then the problem of mounting and removing the tire is onerous and so time consuming as to be highly undesirable in a high speed operation. Additionally, this subjects the sealing beads to undesirable abuse. Parenthetically, when the expression "tubeless tire" is used hereinafter, it is not necessarily limited to those tires on which inner tubes are not required but may also refer to a tire which uses an inner tube but has the tube removed at the time at which reference is made to it.

It has also been known to mount the tire between two separable halves of a special rim made for the purpose. This device is time consuming to use since the rim halves must be disassembled to mount, reassembled to use, and again disassembled to remove. In its simpler form, this device does not permit tire inflation so that the tire yields under pressure and is difficult to surface accurately. Another known device supports the tire on rollers; although easier to mount and demount, the tire still cannot be inflated in such device. The prior art structures which do enable inflation have been far too complicated, expensive and slow in operation for modern competitive conditions. As a result tubeless tires are usually resurfaced without inflation and highly inaccurate results obtained.

Accordingly, it is an object of the present invention to provide an improved apparatus for mounting tires in dependable position for work thereon, even including tubeless tires.

Another object is to provide an apparatus for mounting a tubeless tire which permits inflation of the tire while mounted.

Another object is to enable accurate surfacing of a tire.

Another object is to provide an apparatus for mounting a tire to enable rebuilding and/or repair of the tire which apparatus is simple and economical to use.

Another object is to minimize the time and cost of recapping tires.

Another object is to provide an apparatus of the nature described which does not require assembly or disassembly of parts during use.

Another object is to provide a tire mounting apparatus which is dependable in operation, durable in form and adapted to mount various types and sizes of tires.

These together with other objects will become more fully apparent upon reference to the following description.

In the drawings:

Fig. 1 is a perspective view of a buffer, a tire, and an apparatus for mounting the tire for engagement with the buffer which embodies the principles of the present invention.

Fig. 2 is a somewhat enlarged cross section taken transversely of the tire mounting sleeve shown in Fig. 1 and particularly illustrating an end view of the tire mounting apparatus with a tire mounted thereon.

Fig. 3 is a fragmentary face view of a pair of adjacent rim segments and a bridging plate taken from a position indicated by line 3—3 of Fig. 2.

Fig. 4 is a cross section of the apparatus and tire taken on a plane indicated by line 4—4 of Fig. 2.

Fig. 5 is a view similar to Fig. 4 but showing a second form of the present invention.

Referring more particularly to the drawings, an upright stand 10 is shown in Fig. 1. A motor 11 is mounted on the stand and provides an endwardly extended horizontal output shaft 12. A buffing wheel 13 is mounted on the shaft, and a shielding hood 14 is supported by the stand in partially enclosing relation to the wheel.

A supporting linkage 20 is mounted on the stand 10 and includes a substantially horizontal support shaft 21. Inasmuch as the details of the linkage are not essential to the present invention, they will not be specifically described. It is only to be noted that the linkage enables movement of the shaft toward and away from the buffing wheel 13 and also permits angular adjustments of the tire support shaft 21 relative to the motor shaft 12.

An elongated cylindrical sleeve 25 is rotatably fitted on the shaft 21 and provides a linkage end 26 and a terminal end 27. The sleeve also has a pair of spaced externally threaded sections 28 and 29 adjacent to the opposite ends. The sections 28 and 29 are oppositely threaded, that is for example, the section 28 has left-hand threads while the section 29 has right-hand threads, or vice versa.

Annular collars 35 are provided having threading bores 36 screw-threadably fitted on the sections 28 and 29 of the sleeve for movement toward and away from each other. When the collars are held stationary and the sleeve rotated on the shaft 21, the collars are simultaneously moved toward or away from each other depending upon the direction of rotation of the sleeve. Pairs of spaced lugs 37 are radially outwardly extended from the collars in substantially equally circumferentially spaced relation to each other.

An elongated cylindrical hub 40 is rotatably mounted on the sleeve 25 intermediate the threaded sections 28 and 29. Stop rings 41 are slidably fitted over the sleeve 25 against opposite ends of the hub, and setscrews 42 are extended through the rings and engage the sleeve for securing the rings in position on the sleeve. The hub is thus held in predetermined axial position on the sleeve by the stop rings. A plurality of elongated cylindrical tubes 43 are rigidly radially outwardly extended from the hub in substantially equally angularly spaced relation to each other. The tubes have cylindrical bores 44 open at their outer ends. Cylindrical plunger rods 45 are individually slidably mounted in the bores for radial movement inwardly and outwardly relative to the hub. The plunger rods have outer ends 46 extended outwardly of the tubes.

A diametrically expansible and contractible rim 50, best shown in its entirety in Fig. 2, includes a plurality of fractionally cylindrical, channel-shaped, tire-receiving rim segments 51. Each of the segments includes an arcuate intermediate web 52 individually rigidly mounted on the outwardly extended ends 46 of the rods 45 so as to have longitudinal edges 53 and transverse edges 54, considered with respect to the shaft 21.

Pairs of lugs 58 are provided adjacent to the transverse edges 54 of each of the webs 52. Elongated, rigid links 59 provide inner ends 60 individually pivotally connected by pins 61 to the spaced lugs 37 on the collars 35, and outer ends 62 individually pivotally connected between the lugs 58 on the rim segments by pins 61. The rim segments also have spaced substantially parallel flanges 63 radially outwardly extended from the transverse edges 54 of the webs 52.

It will be evident that the links 59 mount the webs 52 in substantially concentric relation to the shaft 21. Each segment 51, its connecting links 59, the collars 35, and the sleeve 25 constitute a trapezoidal linkage, as best seen in Fig. 4. In other words, as the collars are moved simultaneously toward and away from each other, the links maintain the webs in said concentric relation. Considered as a whole, the rim segments are movable between collapsed or contracted positions with the webs 52 and flanges 63 nested in continuous rim formation and so that the webs form a substantially continuous cylinder circumscribing the shaft, and an expanded position with the segments radially outwardly spaced from their contracted positions and with adjacent longitudinal edges 53 of adjacent webs 52 in spaced relation to each other.

The rim 50 also provides an endless, annular, elastic band 70 of resiliently flexible and compressible material having an inner surface 71 circumscribing the webs 52 of the rim segments 51, an outwardly disposed surface 72 and transverse end edges 73 in adjacent relation to the flanges 63. The band yieldably urges the segments into contracted positions but is sufficiently elastic to be moved by the segments into diametrically enlarged or expanded condition when the segments are expanded. The band has an air passageway 75 through which is extended an air inlet conduit 77. A valve 76 is mounted in the conduit, and the latter is adapted for connection at its outer end to a source of air or other gas under pressure, not shown.

A plurality of resiliently flexible plates 80, preferably of steel, provide outer surfaces 81 vulcanized to the inner surface 71 of the band 70 in spanning relation to adjacent webs 52 and inner surfaces 82 in slidable engagement with said webs. The plates have transverse end edges 83 adjacent to the flanges 63 and longitudinal edges 84 in circumferentially spaced relation to each other, as best seen in Fig. 3.

A hub 90 is mounted on the terminal end 27 of the sleeve 25 and fixed in position thereon by a setscrew 91. A crank 92 is secured to the hub, and a handle 93 is provided on the crank to turn the crank and thereby rotate the sleeve on the shaft 21. A collet 94 is secured to the shaft 21 against the terminal end of the sleeve by means of a setscrew 95.

Second form

The second form of the present invention is illustrated in Fig. 5. Inasmuch as many of the parts of the second form are identical to the first form only the differences will be discussed in detail. Thus, the shaft 21 is shown, and an elongated cylindrical sleeve 100 is rotatably fitted on the shaft having a linkage end 101 and a terminal end 102. The sleeve has an external smooth surface, and a stationary collar 105 is fixedly mounted on the linkage end of the sleeve by means of a setscrew 106. Spaced pairs of lugs 107 are rigidly radially outwardly extended from the stationary collar.

A slide collar 110 is longitudinally slidably fitted on the sleeve 100 relatively adjacent to the terminal end 102 with respect to the stationary collar 105 and is longitudinally slidable toward and away from the stationary collar. Spaced pairs of lugs 111 are also outwardly extended from the slide collar.

A rim 120 is provided and is of the same construction as the rim 50. Accordingly, the elements thereof will be merely referred to by number and for further description, attention is directed to the description of rim 50. The rim 120 provides rim segments 121 having webs 122 and flanges 123. An elastic band 124 circumscribes the webs, and resiliently flexible plates 125 are secured to the band in slidable spanning relation to adjacent webs. An air conduit 127 is mounted in the band, and a valve 126 is connected to the conduit. Elongated rigid links 128 individually pivotally interconnect the lugs 107 and 111 to lugs 129 on the rim segments 121 to provide a trapezoidal linkage, as before.

An hydraulic ram 135 includes a cylinder 136 mounted in circumscribing spaced relation on the sleeve 100 at the terminal end 102 thereof. The cylinder has a rear closed end 137 secured to the sleeve by means of a setscrew 138, and a forward open internally threaded end 139. An annular nut 140 is screw-threaded in the open end 139. The cylinder has an inlet port 141 at the rear end thereof, and an hydraulic conduit 142 is connected to the inlet port and is further adapted for connection to a source of hydraulic fluid under pressure, not shown.

An annular piston 146 is circumscribingly slidably fitted on the sleeve 100 within the cylinder 136 for longitudinal reciprocal movement within the cylinder between the forward and rearward ends 139 and 137 thereof. An elongated annular piston rod 147 is secured to the piston and extends forwardly outwardly through the open end 139 in circumscribing slidable engagement on the sleeve. O-rings 148 are provided in the nut 140 around the piston rod, in the piston around the sleeve and in engagement with the cylinder, and within the rear end 137 around the sleeve. A collet 155 is fitted on the shaft 21 against the rear end of the cylinder and is secured in fixed position by means of a setscrew 156.

Operation of the first form

The operation of both forms of the subject invention are believed to be readily apparent and operation of the first form is briefly summarized at this point. The crank 92 is rotated in a direction, counterclockwise for example, whereby the sleeve 25 is rotated on the shaft 21 and the collars 35 are moved away from each other along the threaded sections 28 and 29. This moves the rim segments 51 radially inwardly into their cylinder-forming contracted positions.

A tire 160 and having beads 161 is mounted on the contracted rim 50 with the beads in engagement with the outer surface 72 of the band 70. For this purpose the tire is positioned over the terminal end 27 of the sleeve and the adjacent flange 63 onto the rim. It is to be noted that the rim is sufficiently contractible so that it is not necessary to wedge or leverage the tire onto the rim.

With the tire 160 thus mounted, the crank 92 is rotated in a clockwise direction to thread the collars 35 toward each other and to expand the rim 50. The rim segments 51 are moved radially outwardly and the band 70 is diametrically enlarged and brought into peripheral substantially air-tight engagement with the beads 161 of the tire. Air is then admitted through the conduit 77 into the tire to inflate it. Inflation of the tire causes the beads to move outwardly into engagement with the flanges 63 and also further increases the air-tight contact of the beads and the band. The primary sealing effect, however, is between the band and the inner or bottom surfaces of the beads. In this condition, the tire 160 may be positioned against the buffing wheel 13 and the motor 11 energized to rotate the wheel. Inflation of the tire prevents buckling when the tire is firmly pressed against the wheel. The tire is free to rotate on the shaft 21 or may be held stationary if desired.

After the buffing operation has been completed and it is desired to remove the tire 160, the crank 92 is turned clockwise to contract the rim 50. It is to be noted that the band 70 yieldably urges the rim segments 51 into their contracted positions although endward movement of the collars 35 positively contracts the rim. As the segments contract, the plates 80 slide against the webs 52 and prevent the band from being pinched between adjacent longitudinal edges 53 of adjacent webs. More significantly prior to segment contraction, the plates 80 preclude inward collapse of the compressible band 70 incident to air pressure in the tire and the leakage which would then result. In actual practice, the plates serve dependably to insure air-tight seal between the band and the inner surfaces of the beads of the tires whenever the rim segments are expanded outwardly to achieve the desired tire engagement. When the rim is sufficiently contracted, the tire is removed.

*Operation of the second form*

The operation of the second form of the invention, shown in use with a tire 165 having beads 166, is identical with the first form except that the rim 120 is expanded and contracted by the hydraulic ram 135. To expand the rim, fluid is admitted into the cylinder 136 through the conduit 142 to force the piston rod 147 against slide collar 110 to slide it inwardly toward stationary collar 105. As long as hydraulic pressure is maintained, the rim is held in expanded position. Upon removal of hydraulic pressure, the band 124 constricts around the rim segments 121 to urge them into their contracted position and to bleed fluid out of the cylinder. This latter occurs since the slide collar 110 is forced against the piston rod 147 to shove the piston 146 rearwardly in the cylinder. The plates 125 not only prevent pinching of the band but also serve to prevent axial shifting of the rim segments 121 and to maintain them in a substantially common plane normal to the shaft 21.

From the foregoing it will be evident that a highly effective apparatus has been provided for mounting a tire in a predetermined position and for enabling inflation of the tire so mounted. The objects of the invention are accomplished principally through the use of an expansible band urged into air-tight contact with the beads of a tire so as to permit the described inflation. The apparatus is economical, easy to use, and dependable in operation. Although it has been described in connection with tire repair and rebuilding, its use in other applications will be readily apparent. Of significance in comparison with prior art devices, it is not necessary to assemble or disassemble parts of the apparatus in order to mount or remove a tire. It will be obvious that the device is adjustable to a wide range of tire sizes.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An apparatus for mounting an inflatable tubeless tire having annular beads and for enabling inflation of the tire comprising an expansible and contractible annular rim circumscribing a predetermined reference axis and including a plurality of arcuate separable rim segments each having spaced radially extended marginal flanges interconnected by a central web, an endless annular elastic band of air impervious material circumscribing the rim, constricted about the webs and transversely extended between the flanges, the band having a transverse substantially flat tire bead engaging surface, means mounting the segments for corresponding movement between a contracted position and an expanded position with the webs radially outwardly spaced from their contracted positions whereby the band is expansible into substantially air-tight engagement with the beads of a tire circumscribingly mounted on the band between the flanges, resiliently flexible plates bonded to the band between the band and the webs and in spanning slidable engagement with adjacent webs, and powered means connected to the mounting means for moving the segments between their expanded and contracted positions.

2. An apparatus for mounting an inflatable tubeless tire and for enabling inflation of the tire comprising a support; an elongated sleeve mounted on the support having opposite ends; collars individually mounted on the sleeve, one of the collars being movable toward and away from the other collar; a plurality of fractionally cylindrical, transversely channel-shaped, tire-receiving segments having longitudinally arcuate transversely flat intermediate webs and providing adjacent end edges disposed circumferentially of the shaft and side edges disposed axially of the shaft; elongated rigid links individually pivotally interconnecting the collars and the segments for movement of the segments between contracted positions in nested relation with adjacent end edges of adjacent segments in engagement and expanded positions with said end edges spaced apart in response to movement of the collars relatively toward and from each other respectively, the segments having flanges outwardly extended along their side edges and being substantially continuous in said contracted positions of the segments and being spaced apart in said expanded positions; an annular endless elastic band of air impervious material having an air inlet opening, a transversely substantially flat outer surface adapted for engagement with the beads of a tire mounted in circumscribing relation on the segments, an inner surface circumscribing the webs of the segments, and transversely extended between the flanges yieldably urging the segments into contracted positions; means releasably closing the air inlet opening of the band; resiliently flexible plates bonded to the inner surface of the band in slidable engagement with the segments and individually bridging adjacent webs to prevent pinching of the band by the segments when contracted; and means for moving said one collar toward and away from the other collar to move the segments between said expanded positions wherein the band is in air-tight engagement with the tire beads and said contracted positions permitting mounting and removal of the tire on and off of the segments, the tire being inflatable when the segments are expanded whereby the beads are urged against the flanges of the segments.

3. An apparatus for mounting an inflatable tubeless tire and for enabling inflation of the tire comprising a support; an elongated shaft rigidly mounted in the support; an elongated sleeve rotatably fitted on the shaft having opposite ends and spaced externally oppositely threaded sections adjacent to said ends; collars individually screw-threaded on the threaded sections of the sleeve for simultaneous movement toward and away from each other upon rotation of the sleeve relative to the collars; a hub rotatably mounted on the sleeve between the threaded sections; a plurality of hollow tubes rigidly radially extended from the hub in substantially equidistantly spaced relation circumferentially of the sleeve and also in substantially equidistantly spaced relation between the threaded sections, the tubes having outwardly disposed open ends; rods individually slidably received in the tubes for movement radially outwardly and inwardly of the sleeve between expanded and contracted positions, respectively; a plurality of fractionally cylindrical transversely channel-shaped, tire-receiving segments having longitudinally transversely flat arcuate intermediate webs circumscribing the shaft and providing adjacent end edges and opposite side edges, said segments being individually rigidly secured to the rods for movement with the rods between contracted positions in nested relation with the end edges of adjacent segments in engagement and expanded positions with said edges spaced apart, the segments having spaced flanges outwardly extended from the side edges of their respective webs which are substantially continuous in said contracted positions of the segments and being spaced apart in said expanded positions; elongated rigid links individually pivotally interconnecting the collars and the segments adjacent to their side edges and substantially equidistantly between their end edges; an annular endless elastic band of air impervious material having an air inlet opening, an outer transversely substantially flat surface adapted for engagement with the beads of a tire mounted in circumscribing relation on the segments, an inner surface circumscribing the webs of the segments, being transversely extended between the flanges and yieldably urging the segments into contracted positions; resiliently flexible plates bonded to the inner surface of the band in slidable engagement with the segments and individually bridging adjacent webs; and a crank secured to the sleeve for rotating the sleeve on the shaft to move the collars toward and away from each other thereby to move the segments between said expanded positions wherein the band is in air-tight engagement with the tire beads and said contracted positions permitting mounting and removal of the tire on and off of the segments, the tire being inflatable when the segments are expanded whereby the beads are urged against the flanges of the segments.

4. An apparatus for mounting an inflatable tubeless tire comprising a support; an elongated sleeve mounted in the support; a stationary collar rigidly mounted on the sleeve; a slide collar spaced from the stationary collar and being slidable toward and away from the stationary collar; a plurality of fractionally cylindrical transversely channel-shaped, tire-receiving segments having arcuate intermediate webs circumscribing the sleeve and providing adjacent end edges and opposite side edges; rigid elongated links individually pivotally interconnecting the collars and the segments adjacent to opposite side edges for movement of the segments incident to sliding of the slide collar on the sleeve between contracted positions in nested relation with adjacent end edges of adjacent segments in engagement and expanded positions with said end edges spaced apart, the segments also having spaced flanges outwardly extended from the side edges of their respective webs and being substantially continuous in said contracted positions of the segments and being spaced apart in said expanded positions; an annular endless elastic band of air impervious material having an air inlet opening, a transversely substantially flat outer surface adapted for engagement with the beads of a tire mounted in circumscribing relation on the segments, an inner surface circumscribing the webs of the segments, being extended between the flanges and yieldably urging the segments into contracted positions; resiliently flexible plates bonded to the inner surface of the band in slidable engagement with the segments and individually bridging adjacent webs to hold the band outwardly against air pressure in a tire mounted thereon; and an hydraulic ram mounted on the sleeve including a longitudinally reciprocal annular piston rod circumscribing the sleeve and engaging the slide collar for moving it toward the stationary collar upon development of hydraulic pressure to expand the ram thereby to move the segments into said expanded positions wherein the band is urged into air-tight engagement with the tire beads, said band sliding the collar away from the stationary collar upon relief of said hydraulic pressure on the ram to permit mounting and removal of the tire on and off of the segments, the tire being inflatable when the segments are expanded whereby the beads are urged against the flanges of the segments.

5. An apparatus for mounting a tubeless tire comprising an annular band of elastic material having inner and outer surfaces, a plurality of longitudinally arcuate transversely flat rim segments engaged against the inner surface of the band, means connected to the segments adapted correspondingly to move the segments outwardly against the band to expand the same and to retract the segments for contraction of the band all while maintaining a substantially circular arrangement of the segments of correspondingly varied circumference, and elongated, longitudinally resiliently flexible plates bonded to the inner surface of the band and individually mounted in longitudinally slidable bridging relation between the segments.

6. In an apparatus for mounting an inflatable tire having annular beads, an annular rim substantially concentric to a reference axis and divided into elongated segments each having transversely spaced outwardly extended flanges, a longitudinally arcuate, transversely flat web transversely interconnecting the flanges of its respective segment, and oppositely disposed ends, the ends of the consecutively adjacent segments being juxtapositioned in adjacent spaced relation; means interconnecting the segments for corresponding reciprocal movement between contracted positions in which the segments are disposed in a continuous annulus with adjacent ends of adjacent segments in abutment and radially expanded positions in which said adjacent ends are substantially equally spaced so that the segments are in annular arrangement of substantially greater circumferences than said continuous annulus; a continuous band of elastic, resiliently compressible and flexible material mounted in circumscribing relation on the webs of the rim segments and having a transversely substantially flat outer surface, an inner surface in flush engagement with the webs, and opposite annular side edges respectively engaging the flanges, said flanges being extended outwardly from the outer surface of the band; and elongated, longitudinally resiliently flexible, plates bonded to the inner surface of the band in spaced relation circumferentially of the band, having opposite side edges slidably engaging the flanges of the rim segments, and individually longitudinally slidably bridging adjacent segments of the rim.

7. An apparatus for mounting a tubeless tire comprising an annular band of elastic material having inner and outer surfaces, a plurality of longitudinally arcuate, transversely flat, rim segments engaged against the inner surface of the band, means connected to the segments adapted correspondingly to move the segments outwardly against the band to expand the same and to retract the segments for contraction of the band all while maintaining a substantially circular arrangement of the segments of correspondingly varied circumference, and elongated, longitudinally resiliently flexible plates individually longitudinally slidably bridging adjacent segments between the segments and the inner surface of the band.

8. An apparatus for mounting a tubeless tire having beads comprising an annular rim divided into arcuate segments having opposite ends with adjacent ends of adjacent segments in opposed relation to each other, means interconnecting the segments for adjustable radial movement between retracted positions in which the segments are in end to end abutment in circular arrangement and radially expanded positions in which the segments are in end to end spaced relation in circular arrangement, an elastic band circumscribing the rim having an outer transversely substantially flat surface disposed for air tight engagement with the beads of a tire mounted thereon and an inner surface engaging the segments, and resiliently flexible plates positioned between the inner surface of the band and the segments with the plates individually overlapping adjacent segments, the plates being longitudinally slidable relative to the segments during adjustable radial movement of the segments between retracted and expanded positions.

References Cited in the file of this patent

UNITED STATES PATENTS

| | | |
|---|---|---|
| 1,869,680 | Freeman | Aug. 2, 1932 |
| 2,158,167 | Wikle | May 16, 1939 |
| 2,197,808 | Mason | Apr. 23, 1940 |
| 2,399,572 | Powell et al. | Apr. 30, 1946 |
| 2,411,687 | James | Nov. 26, 1946 |
| 2,514,964 | Miller et al. | July 11, 1950 |
| 2,694,247 | Rose | Nov. 16, 1954 |

FOREIGN PATENTS

| | | |
|---|---|---|
| 514,764 | Canada | July 19, 1955 |
| 1,130,534 | France | Feb. 6, 1957 |